United States Patent
Matsui et al.

(10) Patent No.: US 6,677,084 B1
(45) Date of Patent: Jan. 13, 2004

(54) SOLID CROSSLINKED-POLYMER ELECTROLYTE AND USE THEREOF

(75) Inventors: Shouhei Matsui, Amagasaki (JP); Katsuhito Miura, Amagasaki (JP); Masato Tabuchi, Amagasaki (JP); Hiroki Higobashi, Amagasaki (JP)

(73) Assignee: Daiso Co., Ltd., Osaka (JP)

( * ) Notice: Subject to any disclaimer, the term of this patent is extended or adjusted under 35 U.S.C. 154(b) by 0 days.

(21) Appl. No.: 09/719,637

(22) PCT Filed: Apr. 18, 2000

(86) PCT No.: PCT/JP00/02505

§ 371 (c)(1),
(2), (4) Date: Dec. 15, 2000

(87) PCT Pub. No.: WO00/63292

PCT Pub. Date: Oct. 26, 2000

(30) Foreign Application Priority Data

Apr. 19, 1999 (JP) ............................................. 11-110810

(51) Int. Cl.$^7$ ............................................. H01M 10/40
(52) U.S. Cl. ..................... 429/317; 429/305; 429/306
(58) Field of Search ..................... 252/62.2; 429/189, 429/305, 306, 317

(56) References Cited

U.S. PATENT DOCUMENTS

| | | | | |
|---|---|---|---|---|
| 4,818,644 A | | 4/1989 | Armand | 429/192 |
| 5,162,174 A | * | 11/1992 | Andrei et al. | 429/312 |
| 6,019,908 A | | 2/2000 | Kono et al. | 252/62.2 |
| 6,228,942 B1 | * | 5/2001 | Michot et al. | 525/183 |
| 6,239,204 B1 | * | 5/2001 | Miura et al. | 524/401 |
| 6,319,428 B1 | * | 11/2001 | Michot et al. | 252/500 |
| 6,361,709 B1 | * | 3/2002 | Bauer et al. | 252/62.2 |

FOREIGN PATENT DOCUMENTS

| | | | | |
|---|---|---|---|---|
| EP | 0 174 894 | | 3/1986 | |
| EP | 0 425 255 | | 5/1991 | |
| EP | 0 585 072 | | 3/1994 | |
| EP | 0 838 487 | | 4/1998 | |
| EP | 838487 A2 | * | 4/1998 | ........... C08G/65/08 |
| EP | 0 856 538 | | 8/1998 | |
| EP | 0 885 913 | | 12/1998 | |
| EP | 0 897 941 | | 2/1999 | |
| JP | 61-83249 | | 4/1986 | |
| JP | 62-249361 | | 10/1987 | |
| JP | 2-235957 | | 9/1990 | |
| JP | 3-200865 | | 9/1991 | |
| JP | 5-202281 | | 8/1993 | |
| JP | 6-076829 | | 3/1994 | |
| JP | 9-324114 | | 12/1997 | |
| JP | 10-176105 | | 6/1998 | |
| WO | 96/08051 | | 3/1996 | |
| WO | 97/42251 | | 11/1997 | |
| WO | 98/07772 | | 2/1998 | |
| WO | 98/25990 | | 6/1998 | |

* cited by examiner

Primary Examiner—Carol Chaney
(74) Attorney, Agent, or Firm—Wenderoth, Lind & Ponack, L.L.P.

(57) ABSTRACT

A solid polymer electrolyte containing (I) a crosslinked material obtainable by crosslinking a composition containing (i) a polyether copolymer having a weight-average molecular weight within a range from $10^5$ to $10^7$ and having 5 to 95 mol % of repeating unit derived from a glycidyl compound, and 95 to 5 mol % of repeating unit derived from ethylene oxide, (ii) a crosslinking agent selected from organic peroxides and azo compounds, and (iii) a crosslinking aid which is an organic compound having a carbon-carbon double bond and an imide group, (II) an electrolyte salt compound, and (III) a plasticizer, is excellent in mechanical properties and ionic conductivity.

18 Claims, No Drawings

SOLID CROSSLINKED-POLYMER ELECTROLYTE AND USE THEREOF

This application is a 371 of PCT/JP00/02505 filed Apr. 18, 2000.

TECHNICAL FILED

The present invention relates to a composition for a solid polymer electrolyte and a crosslinked material thereof, and more particularly to a solid polymer electrolyte suitable for a material for an electrochemical device such as a battery, a capacitor, a photovoltaic conversion element and a sensor.

RELATED ART

Hitherto, in view of ionic conductivity, an electrolyte in the form of solution or paste has been used as an electrolyte constituting an electrochemical device such as a battery, a capacitor, a photovoltaic conversion element and a sensor. However, problems have been pointed out such as a fear of damage to apparatus by liquid leakage and a limitation to fabricating super-small or thin devices due to the need for a separator that is impregnated with an electrolytic solution. To solve these problems, solid electrolytes such as inorganic crystalline substances, inorganic glass, and organic polymeric substances are proposed. The organic polymeric substances are generally excellent in processability and moldability, and solid electrolytes obtained therefrom have good flexibility and bending processability to provide a high degree of freedom in the design of devices to which the electrolytes are applied, so that their development is highly expected. However, at the present time, the organic polymeric substances are inferior to other materials in view of ionic conductivity.

Due to the discovery of ionic conductivity in a system comprising a homopolymer of ethylene oxide and an alkali metal ion, the active researches of solid polymer electrolytes are now being made. Polyethers such as polyethylene oxide are considered as being the most promising polymer matrixes in view of high mobility and solubility of metal cation. Migration of ions are prospected to occur not in a crystal part but in an amorphous part of the polymer. Since then, the copolymerization with various epoxides have been carried out in order to reduce the crystallinity of polyethylene oxide. Japanese Patent Kokai Publication No. 62-249361 (1987) discloses a solid electrolyte comprising a copolymer of ethylene oxide and propylene oxide; and U.S Pat. No. 4,818,644 discloses a solid electrolyte comprising a copolymer of ethylene oxide and methyl glycidyl ether. However, none of these has a satisfactory ionic conductivity.

Further, Japanese Patent Kokai Publication No. 02-235957 (1990) including the present applicants proposes an attempt to allow a specific alkali metal salt to be contained in a mixture of an epichloro-hydrin/ethylene oxide copolymer and a low-molecular-weight polyethylene glycol derivative for application to a solid polymer electrolyte. However, a practically sufficient value of conductivity has not yet been obtained.

Recently, Japanese Patent Kokai Publication No.09-324114 (1997) including the present applicants discloses a copolymer of ethylene oxide and an oxirane compound having an ethylene oxide unit in a side chain, as a copolymer having a high ion-conductivity. However, because the copolymer is a non-crosslinked material, the copolymer involves a problem in shape stability, and in particular, the copolymer lacks in strength as a film at a high temperature, so that the copolymer cannot be used as a solid polymer electrolyte. Further, WO97/4225 1 including the present applicants discloses crosslink of this polymer, where copolymerization with a monomer having a reactive group as a third component is carried out for crosslink. However, introduction of the third component deteriorates the ionic conductivity of the copolymer to greatly reduce the properties for a solid polymer electrolyte. Furthermore, if the reactive group is an ethylenically unsaturated group such as an allyl group, the reactive group is unstable to heat or ultraviolet rays, whereby a gel compound insoluble in solvents is produced. Also, if the reactive group is a reactive silicon group, the reactive group reacts with moisture in ambient air, whereby also a gel compound insoluble in solvents is produced, so that the gel compound cannot be treated as a film.

SUMMARY OF THE INVENTION

An object of the present invention is to provide a solid electrolyte excellent in mechanical properties and ionic conductivity.

The present invention provides a composition comprising:

(i) a polyether copolymer having a weight-average molecular weight within a range from $10^5$ to $10^7$ and comprising (A) 5 to 95 mol % of repeating unit derived from a monomer represented by the formula (1):

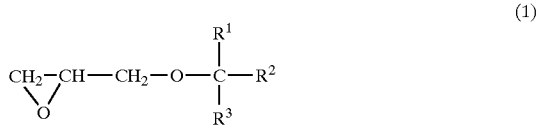

wherein $R^1$, $R^2$ and $R^3$ each is a hydrogen atom or —$CH_2O(CH_2CH_2O)_nR$ where n and R may be different among $R^1$, $R^2$ and $R^3$, provided that all of $R^1$, $R^2$ and $R^3$ are not simultaneously a hydrogen atom; R is an alkyl group having 1 to 12 carbon atoms; and n is from 0 to 12, and (B) 95 to 5 mol % of repeating unit derived from a monomer represented by the formula (2):

(ii) a crosslinking agent selected from an organic peroxide and/or an azo compound, and (iii) a crosslinking aid which is an organic compound having a carbon-carbon double bond and an imide group.

In addition, the present invention provides a crosslinked material obtainable by crosslinking said composition.

Further, the present invention provides a solid polymer electrolyte comprising:

(1) said crosslinked material,
(II) an electrolyte salt compound, and
(III) an optionally present plasticizer selected from the group consisting of an aprotic organic solvent, a derivative and metal salt of linear or branched polyalkylene glycol having a number-average molecular weight of from 200 to 5,000, and a metal salt of the derivative.

Yet further, the present invention provides also a battery comprising said solid polymer electrolyte.

EXPLANATION OF THE PREFERRED EMBODIMENTS

When a plasticizer is incorporated into a solid polymer electrolyte, the ionic conductivity will be improved because the crystallization of the polymer is restrained to lower the glass transition temperature, and amorphous phase is formed in a large amount even at a low temperature. The inventors of the present invention also found out that the use of the solid polymer electrolyte of the present invention gives a highly efficient battery having a small internal resistance. The solid polymer electrolyte of the present invention may be in a gel form. Here, the gel refers to a polymer which is swollen by a solvent.

The copolymer of the present invention has (A) repeating unit derived from the monomer of the formula (1):

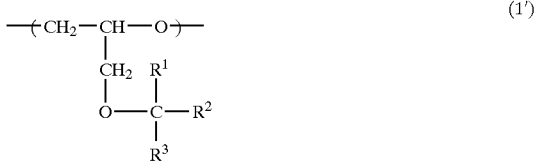

(1')

wherein $R^1$, $R^2$ and $R^3$ each is a hydrogen atom or —$CH_2O(CH_2CH_2O)_nR$ where n and R may be different among $R^1$, $R^2$ and $R^3$, provided that all of $R^1$, $R^2$ and $R^3$ are not simultaneously a hydrogen atom; R is an alkyl group having 1 to 12 carbon atoms; and n is from 0 to 12, and (B) repeating unit derived from the monomer of the formula (2):

(2')

At least one group, i.e. one, two, or three groups among $R^1$, $R^2$ and $R^3$ groups are —$CH_2O(CH_2CH_2O)_nR$. The number n may be from 1 to 12, for example, from 2 to 10. The repeating unit (A) in the copolymer of the present invention may be derived from at least two types of monomers.

The polymerization reaction can be carried out as follows. The polyether copolymer can be obtained by reaction of the monomers under stirring at a reaction temperature of from 10 to 80° C. in the presence or absence of a solvent with the use of a catalyst system based on organic aluminum, a catalyst system based on organic zinc, or an organic tin/phosphoric acid ester condensate catalyst system or the like as a catalyst for ring-opening polymerization. Among these, the organic tin/phosphoric acid ester catalyst system is preferable in view of the polymerization degree or the properties of the resultant copolymer.

In the polyether copolymer of the present invention, the molar ratio of the repeating unit (A) and the repeating unit (B) is so that the repeating (A) is from 5 to 95 mol %, preferably from 10 to 95 mol %, and the repeating unit (B) is from 5 to 95 mol %, preferably from 5 to 90 mol %. When the repeating unit (B) is contained in the amount of at most 95 mol %, a higher ionic conductivity of the solid electrolyte is obtained. It is generally known that the ionic conductivity is improved by lowering the crystallinity of polyethylene oxide. The inventors of the present invention have found out that the effect of improvement of ionic conductivity is outstandingly large in the case of the polyether copolymer used in the present invention.

The molecular weight of the polyether copolymer is suitably such that the weight-average molecular weight is within a range from $10^5$ to $10^7$, preferably within a range from $5 \times 10^5$ to $5 \times 10^6$, in order to obtain good processability, moldability, mechanical strength, and flexibility.

When the copolymer has a weight-average molecular weight of at least $10^5$, the elongation at break is higher.

In the present invention, a polyether copolymer suitable for use has a glass transition temperature of at most −40° and a heat of fusion of at most 90 J/g. The copolymer having a glass transition temperature and heat of fusion exceeding the aforesaid values may possibly invite decrease in ionic conductivity. The glass transition temperature and the heat of fusion of the polyether copolymer are measured by a differential scanning calorimeter (DSC).

The copolymer of the present invention is a polyether copolymer having an oligooxyethylene group at a side chain. The copolymer before crosslink may be any type of a block copolymer or a random copolymer. A random copolymer is preferable because it has a larger effect of reducing the crystallinity of polyethylene oxide.

The crosslinked material of the present invention is a crosslinked material which is obtained by crosslinking a composition for crosslink comprising a polyether copolymer having an oligooxyethylene group at a side chain, a crosslinking agent, and a crosslinking aid, in the presence or absence of an organic solvent.

The crosslinked material of the present invention is completely different from a material produced by crosslinking a copolymer obtained by copolymerization of a monomer having a reactive group such as an unsaturated group or an epoxy group as a new third component. The introduction of the reactive group-containing monomer as the third component for crosslink decreases the ionic conductivity of the copolymer and also, if a large amount of the reactive group-containing monomer is used, the performance of a solid electrolyte will also be deteriorated. The present invention provides the solid polymer electrolyte being excellent in strength while maintaining physical properties of the composite containing a copolymer having high ionic conductivity.

The method of crosslinking the copolymer is characterized by combination of the crosslinking agent and the crosslinking aid as shown below.

The crosslinking agent is suitably an organic peroxide or an azo compound.

As the organic peroxide, there can be used those which are normally used in the crosslink, such as a ketone peroxide, a peroxy ketal, a hydroperoxide, a dialkyl peroxide, a diacyl peroxide and a peroxy ester. Specific examples of the organic peroxide include 1,1-bis(t-butylperoxy)-3,3,5-trimethylcyclohexane, di-t-butyl peroxide, t-butylcumyl peroxide, dicumyl peroxide, 2,5-dimethyl-2,5-di(t-butylperoxy)hexane and benzoylperoxide.

As the azo compound, there can be used those which are normally used in the crosslink, such as an azonitrile compound, an azoamide compound and an azoamidine compound. Specific examples of the azo compound include 2,2'-azobisisobutyronitrile, 2,2'-azobis(2-methylbutyronitrile), 2,2'-azobis(4-methoxy-2,4-dimethylvaleronitrile), 2,2'-azobis(2-methyl-N-phenylpropionamidine) dihydrochloride, 2,2'-azobis[2-(2-imidazolin-2-yl) propane], 2,2'-azobis[2-methyl-N-(2-hydroxyethyl) propionamide], 2,2'-azobis(2-methylpropane) and 2,2'-azobis [2-(hydroxymethyl) propionitrile].

The amount of the crosslinking agent to be added depends on the type of the crosslinking agent, and may be from 0.001 to 1 part by weight, for example from 0.1 to 1 part by weight, relative to 100 parts by weight of the copolymer.

The crosslinking aid may be an organic compound having a carbon-carbon double bond and an imide group. For example, a maleimide-based compound may be mentioned.

A maleimide-based crosslinking aid such as maleimide, phenylmaleimide and N,N'-m-phenylenebismaleimide is suitable for the crosslinking aid.

The amount of the crosslinking aid to be used for crosslinking reaction may be within a range from 0.5 to 6 parts by weight, preferably from 1 to 4 parts by weight, relative to 100 parts by weight of the polymer. Within this weight range, a crosslinked material is obtained having higher strength and higher solid polymer electrolyte performance.

A crosslinking aid without having an imide group, for example, an acrylate compound such as triethylene glycol diacrylate or polyethylene glycol diacrylate or a methacrylate compound such as triethylene glycol dimethacrylate or polyethylene glycol dimethacrylate is preferably at least 10 parts by weight relative to 100 parts by weight of the polymer.

The electrolyte salt compound to be used in the present invention is preferably soluble in a mixture comprising a polyether copolymer or a crosslinked material of the copolymer, and a plasticizer. In the present invention, an electrolyte salt compound mentioned below is preferably used.

That is, examples of the electrolyte salt compound include a compound composed of a cation selected from metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesulfonate ion, dodecylnaphthalenesulfonate ion, 7,7,8,8-tetracyano-p-quinodimethane ion, $X_1SO_3^-$, $[(X_1SO_2)(X_2SO_2)N]^-$, $[(X_1SO_2)(X_2SO_2)(X_3SO_2)C]^-$ and $[(X_1SO_2)(X_2SO_2)YC]^-$, wherein $X_1$, $X_2$, $X_3$ and Y respectively represent an electron attractive group. Preferably, $X_1$, $X_2$ and $X_3$ independently represent a perfluoroalkyl having 1 to 6 carbon atoms or a perfluoroaryl group having 6 to 18 carbon atoms, and Y represents a nitro group, a nitroso group, a carbonyl group, a carboxyl group or a cyano group. $X_1$, $X_2$ and $X_3$ may be the same or different.

As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

The amount of the electrolyte salt compound to be used in the present invention is preferably such that the ratio of the molar number of the electrolyte salt compound to the total molar number of ether oxygen atoms of the copolymer is within a range from 0.0001 to 5, preferably from 0.001 to 0.5. When the ratio is within this range, the processability, the moldability, and the mechanical strength and flexibility of the obtained solid electrolyte are higher, and the ionic conductivity is also higher.

The plasticizer is an aprotic organic solvent or a derivative or a metal salt of linear or branched polyalkylene glycol having a number-average molecular weight of from 200 to 5,000 or a metal salt of the derivative.

The aprotic organic solvent is preferably an aprotic ether or ester. Specific examples thereof include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxazolidone, tetrahydrofuran, 2-methyltetrahydrofuran, 1,3-dioxolane, 4-methyl-1,3-dioxolane, tert-butyl ether, iso-butyl ether, 1,2-ethoxymethoxy ethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ehylene diglyme, methyl tetraglyme, methyl triglyme, methyl diglyme, methyl formate, methyl acetate and methyl propionate. Two or more of the aprotic organic solvent may be used in combination.

Among the aforementioned examples, propylene carbonate, γ-butyrolactone, butylene carbonate and 3-methyl-2-oxazoline are especially preferable. Triethylene glycol dimethyl ether, triethylene glycol diethyl ether, tetraethylene glycol dimethyl ether and tetraethylene glycol diethyl ether are also especially preferable as the organic solvent.

The derivative or the metal salt of linear or branched polyalkylene glycol (or a metal salt of said derivative) can be obtained from a polyalkylene glycol having a number-average molecular weight of 200 to 5,000. Examples of the polyalkylene glycol include polyethylene glycol and polypropylene glycol. Examples of the derivatives thereof include an ester derivative and an ether derivative having an alkyl group having 1 to 8 carbon atoms.

Among the derivatives, examples of the ether derivative include a diether such as dimethyl ether, diethyl ether and dipropyl ether. Examples of the ester derivative include a diester such as a polyalkylene glycol diacetate ester (e.g. polyethylene glycol diacetate ester).

Examples of the metal salt include sodium, lithium, dialkyl aluminum salts of polyalkylene glycol.

Specific examples of the metal salt of the derivative include sodium, lithium and dialkyl aluminum salts (e.g. dioctyl aluminum salt) of monoethers such as monomethyl ether, monoethyl ether, monopropyl ether, monobutyl ether, monohexyl ether and mono-2-ethyl-hexyl ether, and monoacetate esters. Examples of the metal salt of the polyalkylene glycol derivative include dioctyl aluminum salt of polyethylene glycol monomethyl ether, and dioctyl aluminum salt of polyethylene glycol monoethyl ether.

The especially preferable range of the number-average molecular weight of the used polyalkylene glycol is from 200 to 2,000.

The blending ratio of the plasticizer is arbitrary, but it is preferably from 0 to 1,000 parts by weight, preferably from 1 to 500 parts by weight, relative to 100 parts by weight of the polyether copolymer.

When the flame retardancy is required in using the solid polymer electrolyte, a flame retardant may be used. An effective amount of those selected from a halide (such as a brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate as a flame retardant may be added.

A method for producing the solid polymer electrolyte of the present invention is not particularly limited, but the solid polymer electrolyte can be produced by crosslink after the components are mechanically mixed. However, the solid polymer electrolyte may be impregnated by immersing the solid polymer electrolyte into a plasticizer for a long time after crosslink. A means for the mechanical mixing may be any means such as various kneaders, open rolls, and extruders.

When a radical initiator is used, the crosslinking reaction is ended in one minute to 20 hours under s temperature condition of from 10° C. to 200° C.

A method for mixing the polyether copolymer with the electrolyte salt compound and the plasticizer is not particularly limited, but one can use a method of immersing the polyether copolymer in an organic solvent containing the electrolyte salt compound and the plasticizer for a long time for impregnation, a method of mechanically mixing the electrolyte salt compound and the plasticizer with the polyether copolymer, a method of mixing by dissolving the polyether copolymer and the electrolyte salt compound into the plasticizer, or a method of mixing the plasticizer after the polyether copolymer is once dissolved into another organic solvent. In case of producing the crosslinked solid polymer electrolyte by using the organic solvent, various polar solvents such as tetrahydrofuran, acetone, acetonitrile, dimethyl formamide, dimethyl sulfoxide, dioxane, methyl ethyl ketone, and methyl isobutyl ketone may be used alone or in combination thereof. The organic solvent can be removed before, during or after the polyether copolymer is crosslinked.

The solid polymer electrolyte of the present invention is excellent in mechanical strength and flexibility, and can be easily made into a solid electrolyte having a large area and a thin film shape by utilizing its properties. For example, it is possible to fabricate a battery using a solid polymer electrolyte of the present invention. In this case, examples of a positive electrode material include lithium-manganese double oxide, lithium cobaltate, vanadium pentaoxide, polyacetylene, polyacene, polypyrene, polyaniline, polyphenylene, polyphenylene sulfide, polyphenylene oxide, polypyrrole, polyfuran, and polyazulene. Examples of a negative electrode material include an interlaminar compound prepared by occlusion of lithium between graphite or carbon layers, a lithium metal and a lithium-lead alloy. By utilizing the high ionic conductivity, the crosslinked solid polymer electrolyte can also be used as a diaphragm of an ion electrode of the cation such as alkaline metal ion, Cu ion, Ca ion and Mg ion. The solid polymer electrolyte of the present invention is especially suitable for a material for electrochemical devices such as a battery, a capacitor or a sensor.

It is necessary to make the solid polymer electrolyte capable of being treated as a film, and a crosslinked film thickness is suitably within a range from 5 $\mu$m to 100 $\mu$m, preferably within a range from 10 $\mu$m to 50 $\mu$m. When the film thickness is within this range, the possibility of short circuit is low; the solid polymer electrolyte can be easily handled with; the electrochemical resistance of the solid polymer electrolyte is low; and the performance as a lithium polymer battery is high.

The film strength is preferably such that the strength at break is within a range from 1 MPa to 5 MPa, preferably within a range from 2 MPa to 4 MPa. When the film strength is within this range, the film can be handled with well while maintaining the high ionic conductivity. The elongation at break is suitably within a range from 50% to 400%, preferably within a range from 100% to 300%. When the elongation at break is within this range, the film can be handled with well while maintaining the high ionic conductivity.

PREFERABLE EMBODIMENTS OF THE INVENTION

Hereafter, the present invention will be specifically described by showing examples thereof.

The composition of the polyether copolymer as converted into monomers was determined by $^1$H NMR spectroscopy. The molecular weight of the polyether copolymer was measured by gel permeation chromatography, and the molecular weight was calculated in terms of standard polystyrene. The gel permeation chromatography measurement was carried out at 60° C. in DMF as the solvent, using the measuring device (RID-6A) manufactured by Shimadzu Corporation and the columns (Showdex KD-807, KD-806, KD-806M and KD-803) manufactured by Showa Denko K.K. The glass transition temperature and the heat of fusion were measured, using the differential scanning calorimeter DSC 8230B manufactured by Rigaku Denki K.K., in nitrogen atmosphere and in the temperature range of –100 to 80° C. at a temperature rise rate of 10° C./min. The measurement of conductivity $\sigma$ was carried out by first pinching with platinum electrodes a film which had been vacuum-dried for 72 hours at 20° C. under a pressure of 1 mmHg and then applying a voltage of 0.5 V and a frequency range of 5 Hz to 1 MHz according to the alternating current method. The conductivity $\sigma$ was calculated according to a complex impedance method.

The strength and elongation at break were measured at a pulling rate of 500 mm/min at room temperature by using a test piece of 50 mm×100 mm×(5 to 100) $\mu$m by means of a tensile compression tester TG-200N manufactured by Minebea Co., Ltd.

Synthesis Example (Production of Catalyst)

Tributyltin chloride (10 g) and tributyl phosphate (35 g) were charged in a three-necked flask equipped with a stirrer, a thermometer and a distillation device, and the mixture was heated at 250° C. for 20 minutes with stirring under nitrogen stream and the distillate was distilled off to obtain a solid condensate as a residue product. In the following polymerizations, this condensate was used as a polymerization catalyst.

Polymerization Example 1

The inside of a four-necked glass flask having an inner volume of 3L was substituted with nitrogen, and was loaded with 1 g of the condensate substance obtained in the Synthesis Example as the catalyst, 150 g of a glycidyl ether compound (a):

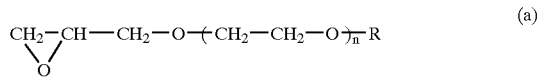

[R=CH$_3$; n=4] having a water content adjusted to be at most 10 ppm, and 1000 g of n-hexane as a solvent, and then 160 g of ethylene oxide was gradually added while monitoring the polymerization rate of the compound (a) by gas chromatography. The polymerization reaction was terminated by methanol. After the polymer was taken out by decantation, the polymer was dried at 40° C. under ordinary pressure for 24 hours and further at 45° C. under reduced pressure for 10 hours to give 290 g of the polymer. The glass transition temperature, the weight-average molecular weight, and the heat of fusion of the copolymer were –72° C., 2,600,000, and 30 J/g, respectively. The result of compositional analysis of the polymer in terms of monomers by $^1$H NMR spectroscopy was ethylene oxide: the compound (a)=86:14 mol %.

Polymerization Example 2

The inside of a four-necked glass flask having an inner volume of 3L was substituted with nitrogen, and was loaded with 1 g of the condensate substance obtained in the Synthesis Example as the catalyst, 180 g of a glycidyl ether compound (b):

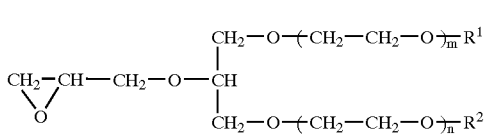

[$R^1$ and $R^2$=$CH_3$; m and n=2] having a water content adjusted to be at most 10 ppm, and 1,000 g of n-hexane as a solvent, and 90 g of ethylene oxide was gradually added while monitoring the polymerization rate of the compound (b) by gas chromatography. The polymerization reaction was terminated by methanol. After the polymer was taken out by decantation, the polymer was dried at 40° C. under ordinary pressure for 24 hours and further at 45° C. under reduced pressure for 10 hours to give 250 g of the polymer. The glass transition temperature, the weight-average molecular weight, and the heat of fusion of the copolymer were −75° C., 1,600,000, and 43 J/g, respectively. The result of compositional analysis of the polymer in terms of monomers by $^1$H NMR spectroscopy was ethylene oxide: the compound (b)=75:25 mol %.

EXAMPLE 1

The copolymer (1 g) obtained in the Polymerization Example 1, a crosslinking agent, benzoyl peroxide (0.001 g), and a crosslinking aid, N,N'-m-phenylenebismaleimide (0.03 g) were dissolved into tetrahydrofuran (20 ml), and a tetrahydrofuran solution of lithium perchlorate was mixed so that the molar ratio (molar number of electrolyte salt compound) / (total molar number of ether oxygen atoms in the copolymer) was 0.05. This mixture liquid was cast onto a mold made of polytetrafluoroethylene and dried, followed by heating at 100° C. for 3 hours to give a crosslinked film having a thickness of 20 μm. The electrical conductivity of the film at 65° C. was $2 \times 10^{-3}$ S/cm, the strength at break was 2.1 MPa, and the elongation at break was 250%.

Comparative Example 1

The copolymer (1 g) obtained in the Polymerization Example 1 and a crosslinking agent, benzoyl peroxide (0.001 g) were dissolved into tetrahydrofuran (20 ml), and a tetrahydrofuran solution of lithium perchlorate was mixed so that the molar ratio (molar number of electrolyte salt compound)/(total molar number of ether oxygen atoms in the copolymer) was 0.05. This mixture liquid was cast onto a mold made of polytetrafluoroethylene and dried, followed by heating at 100° C. for 3 hours. However, a crosslinked film was not obtained.

Comparative Example 2

The crosslink was carried out by the same procedure as in Example 1 except that the crosslinking aid used in Example 1 was replaced with 0.03 g of triethylene glycol dimethacrylate. However, when the film thickness was 20 μm, the film strength was extremely weak and the film could not be handled with. The strength at break of the film was at most 1 MPa, and the elongation at break was at least 400%, thereby showing that little crosslink had occurred.

Comparative Example 3

The crosslink was carried out by the same procedure as in Example 1 except that the crosslinking aid used in Example 1 was replaced with 0.03 g of polyethylene glycol diacrylate (Mw 800). However, the similar result as in Comparative Example 2 was obtained, thereby showing that little crosslink had occurred.

EXAMPLE 2

The copolymer (1 g) obtained in Polymerization Example 2, a crosslinking agent, dicumyl peroxide (0.001 g), and a crosslinking aid, N,N'-m-phenylenebismaleimide (0.025 g) were dissolved into tetrahydrofuran (20 ml), and a tetrahydrofuran solution of lithium perchlorate was mixed so that the molar ratio (molar number of electrolyte salt compound)/ (total molar number of ether oxygen atoms in the copolymer) was 0.05. This mixture liquid was cast onto a mold made of polytetrafluoroethylene and dried, followed by heating at 170° C. for 20 minutes to give a crosslinked film having a thickness of 20 μm. The electrical conductivity of the film at 65° C. was $4 \times 10^{-3}$ S/cm, the strength at break was 2.7 MPa, and the elongation at break was 150%.

Comparative Example 4

A copolymer was obtained by the same procedure as in Polymerization Example 2 except that t-BuOK was used instead of the catalyst used in Polymerization Example 2 and the reaction temperature was set to be 100° C. The glass transition temperature, the weight-average molecular weight, and the heat of fusion of the copolymer were −73° C., 10,000, and 37 J/g, respectively. The result of compositional analysis of the polymer in terms of monomers by $^1$H NMR spectroscopy was ethylene oxide : the compound (b)=72:28 mol %.

The same procedure as in Example 2 was carried out on 1 g of the obtained copolymer to give a crosslinked film. The electrical conductivity of the film at 65° C. was $6 \times 10^{-4}$ S/cm, the strength at break was 0.4 MPa, and the elongation at break was 20%.

EXAMPLE 3

A secondary battery was constructed with the use of a solid polymer electrolyte obtained in Example 1 as an electrolyte, a lithium metal foil as a negative electrode, and lithium cobaltate (LiCoO$_2$) as a positive electrode. The size of the solid polymer electrolyte was 10 mm×10 mm×0.02 mm. The size of the lithium foil was 10 mm×10 mm×0.1 mm. Lithium cobaltate was prepared by admixing predetermined amounts of lithium carbonate and cobalt carbonate powder, followed by calcination at 900° C. for 5 hours. Then, the admixture was ground and, to 85 parts by weight of the obtained lithium cobaltate were added 12 parts by weight of acetylene black, 3 parts by weight of the polymer obtained in the Polymerization Example 1, and lithium perchlorate so that the ratio of the molar number of lithium perchlorate to the molar number of oxyethylene unit in the polymer was 0.05. After mixing with a roll, the mixture was press-molded at a pressure of 300 kgw/cm$^2$ into a size of 10 mm×10 mm×2 mm to give a positive electrode for the battery.

The solid polymer electrolyte obtained in Example 1 was sandwiched between the negative electrode of lithium metal foil and the positive electrode of lithium cobaltate plate, and the charging/discharging characteristics of the battery were examined at 60° C. by applying a pressure of 10 kgw/cm$^2$ so that the interfaces were closely contacted with each other. The discharging current at a terminal voltage of 3.8 V at an initial stage was 0.1 mA/cm$^2$, and the battery was chargeable at 0.1 mA/cm$^2$. The battery of this Example can be easily

EXAMPLE 4

The crosslinked film containing a supporting salt (LiClO$_4$) obtained in Example 2 was impregnated with 20 parts by weight, relative to 80 parts by weight of the crosslinked film, of a branched ether compound (c):

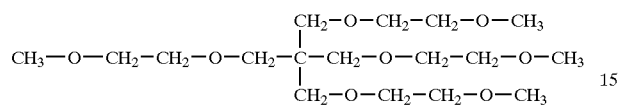

thereby to produce a solid polymer electrolyte.

A secondary battery was constructed with the use of this solid polymer electrolyte, a lithium metal foil as a negative electrode, and lithium cobaltate (LiCoO$_2$) as a positive electrode. The size of the solid polymer electrolyte was 10 mm×10 mm×0.025 mm. The size of the lithium foil was 10 mm×10 mm×0.1 mm. Lithium cobaltate was prepared by admixing predetermined amounts of lithium carbonate and cobalt carbonate powder, followed by calcination at 900° C. for 5 hours. Then, the admixture was ground and, to 85 parts by weight of the obtained lithium cobaltate were added 12 parts by weight of acetylene black and 3 parts by weight of the solid polymer electrolyte obtained in Example 2. After mixing with a roll, the mixture was press-molded at a pressure of 300 kgw/cm$^2$ into a size of 10 mm×10 mm×2 mm to give a positive electrode for the battery.

The solid polymer electrolyte impregnated with the branched ether compound (c) was sandwiched between the lithium metal foil and the lithium cobaltate plate, and the charging/discharging characteristics of the battery were examined at 25° C. by applying a pressure of 10 kgw/cm$^2$ so that the interfaces were closely contacted with each other. The discharging current at a terminal voltage of 3.8 V at an initial stage was 0.2 mA/cm$^2$, and the battery was chargeable at 0.2 mA/cm$^2$. The battery of this Example can be easily fabricated into a thin one, making a battery having light weight and large capacity.

Effects of the Invention

The solid polymer electrolyte of the present invention is superior in processability, moldability, mechanical strength, flexibility, heat resistance, etc., and the ionic conductivity is remarkably improved. Accordingly, the crosslinked solid polymer electrolyte of the present invention has an application to electronic apparatuses such as a large-capacity capacitor, a photovoltaic conversion element, and a display device (e.g. an electrochromic display) in addition to solid batteries (particularly secondary batteries), and an application to an antistatic agent or electrically controlling agent for rubbery and plastic materials.

What is claimed is:

1. A solid polymer electrolyte comprising:
   (I) a crosslinked material obtainable by crosslinking a composition comprising:
      (i) a polyether copolymer having a weight-average molecular weight within a range from 10$^5$ to 10$^7$ and comprising
         (A) 5 to 95 mol % of a repeating unit derived from a monomer represented by the formula (1):

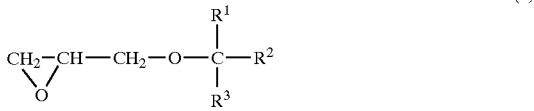

wherein R$^1$, R$^2$ and R$^3$ are the same or different and each is a hydrogen atom or —CH$_2$O(CH$_2$CH$_2$O)$_n$R, where n and R may be different among R$^1$, R$^2$ and R$^3$, provided that all of R$^1$, R$^2$ and R$^3$ are not simultaneously a hydrogen atom; R is an alkyl group having 1 to 12 carbon atoms; and n is from 0 to 12, and
         (B) 95 to 5 mol % of a repeating unit derived from a monomer represented by the formula (2):

(ii) a crosslinking agent selected from an organic peroxide and/or an azo compound, and
      (iii) a crosslinking aid which is an organic compound having a carbon-carbon double bond and an imide group;
   (II) an electrolyte salt compound; and
   (III) optionally a plasticizer selected from the group consisting of an aprotic organic solvent and metal salt of linear or branched polyalkylene glycol having a number-average molecular weight of from 200 to 5,000.

2. The solid polymer electrolyte according to claim 1, wherein the electrolyte salt compound is a compound comprising a cation selected from a metal cation, ammonium ion, amidinium ion or guanidium ion, and an anion selected from chloride ion, bromide ion, iodide ion, perchlorate ion, thiocyanate ion, tetrafluoroborate ion, nitrate ion, AsF$_6^-$, PF$_6^-$, stearylsulfonate ion, octylsulfonate ion, dodecylbenzenesulfonate ion, naphthalenesulfonate ion, dodecylnaphthalenesulfonate ion, 7,7,8,8-tetracyano-p-quinodimethane ion, X$_1$SO$_3^-$, [(X$_1$SO$_2$)(X$_2$SO$_2$)N]$^-$, [(X$_1$SO$_2$)(X$_2$SO$_2$)(X$_3$SO$_2$)C]$^-$ or [(X$_1$SO$_2$)(X$_2$SO$_2$)YC]$^-$, wherein X$_1$, X$_2$X$_3$ and Y each represent an electron attractive group.

3. The solid polymer electrolyte according to claim 2, wherein X$_1$, X$_2$ and X$_3$ independently represent a perfluoroalkyl having 1 to 6 carbon atoms or a perfluoroaryl group and Y represents a nitro group, a nitroso group, a carbonyl group, a carboxyl group or a cyano group.

4. The solid polymer electrolyte according to claim 2, wherein the metal of the metal cation is Li, Na, K, Rb, Cs, Mg, Ca, Ba, Mn, Fe, Co, Ni, Cu, Zn or Ag.

5. The solid polymer electrolyte according to claim 1, wherein the aprotic organic solvent is an ether and/or an ester.

6. The solid polymer electrolyte according to claim 1, wherein the aprotic organic solvent is propylene carbonate, γ-butyrolactone, butylene carbonate, 3-methyl-2-oxazolidone, triethylene glycol dimethyl ether, triethylene glycol diethyl ether, tetraethylene glycol dimethyl ether and/or tetraethylene glycol diethyl ether.

7. The solid polymer electrolyte according to claim 1, wherein the crosslinking aid is a maleimide compound.

8. The solid polymer electrolyte according to claim 1, wherein the crosslinking aid is maleimide, phenylmaleimide, and/or N,N'-m-phenylenebismaleimide.

9. The solid polymer electrolyte according to claim 1, wherein the crosslinked material has a breaking strength within a range from 1 MPa to 5 MPa and a breaking elongation within a range from 50% to 400%.

10. A battery, comprising a solid polymer electrolyte according to claim 1, a positive electrode and a negative electrode.

11. A battery, comprising a solid polymer electrolyte according to claim 2, a positive electrode and a negative electrode.

12. A battery, comprising a solid polymer electrolyte according to claim 3, a positive electrode and a negative electrode.

13. A battery, comprising a solid polymer electrolyte according to claim 4, a positive electrode and a negative electrode.

14. A battery, comprising a solid polymer electrolyte according to claim 5, a positive electrode and a negative electrode.

15. A battery, comprising a solid polymer electrolyte according to claim 6, a positive electrode and a negative electrode.

16. A battery, comprising a solid polymer electrolyte according to claim 7, a positive electrode and a negative electrode.

17. A battery, comprising a solid polymer electrolyte according to claim 8, a positive electrode and a negative electrode.

18. A battery, comprising a solid polymer electrolyte according to claim 9, a positive electrode and a negative electrode.

* * * * *